United States Patent [19]
Salomäki

[11] Patent Number: 6,094,661
[45] Date of Patent: Jul. 25, 2000

[54] TRANSMISSION OF MULTIMEDIA OBJECTS IN A DIGITAL BROADCASTING SYSTEM

[75] Inventor: Ari Salomäki, Järvenpää, Finland

[73] Assignee: Oy Nokia AB, Espoo, Finland

[21] Appl. No.: 08/981,042

[22] PCT Filed: Jun. 12, 1996

[86] PCT No.: PCT/FI96/00348

§ 371 Date: Jan. 26, 1998

§ 102(e) Date: Jan. 26, 1998

[87] PCT Pub. No.: WO96/42144

PCT Pub. Date: Dec. 27, 1996

[30] Foreign Application Priority Data

Jun. 12, 1995 [FI] Finland ................................. 952880

[51] Int. Cl.$^7$ .................................................. G06F 17/30
[52] U.S. Cl. ................................ 707/104; 707/1; 709/249
[58] Field of Search ........................... 707/1, 104; 380/23; 364/514; 395/200.02, 200.32, 200.79; 375/347; 706/59; 709/249

[56] References Cited

U.S. PATENT DOCUMENTS

| | | | |
|---|---|---|---|
| 5,404,505 | 4/1995 | Levinson .................................... | 707/10 |
| 5,574,905 | 11/1996 | DeCarmo .................................... | 707/1 |
| 5,612,900 | 3/1997 | Azadegan et al. ....................... | 364/514 |
| 5,625,693 | 4/1997 | Rohatgi et al. ........................... | 380/23 |
| 5,768,539 | 6/1998 | Metz et al. ......................... | 395/200.79 |
| 5,784,418 | 7/1998 | Sykes et al. .............................. | 375/347 |
| 5,805,804 | 9/1998 | Laursen et al. .................... | 395/200.02 |
| 5,822,745 | 10/1998 | Hekmatpour .............................. | 706/59 |
| 5,838,906 | 11/1998 | Doyle et al. ....................... | 395/200.32 |

FOREIGN PATENT DOCUMENTS

WO 95/08226  3/1995  WIPO .

OTHER PUBLICATIONS

Kretz et al., "Standardizing Hypermedia Information Objects", IEEE May 1992, pp. 60–70.

Markey, "HyTime and MHEG", IEEE 1992, pp. 25–40.

Colaitis et al., "MHEG: An Emerging Standard for the Interchange of Multimedia and Hypermedia Objects", IEEE 1993, pp. 542–546.

Boudnik et al., "MHEG Explained", IEEE Spring 1995, pp. 26–38.

IEICE Transactions on Information and Systems, vol. E79–D, No. 6, Jun. 1996, Hyungseok Chung et al., "Memori: MHEG Engine for Multimedia Information Object Retrieval and Interchange", pp. 680–686.

Primary Examiner—Wayne Amsbury
Assistant Examiner—Thuy Pardo
Attorney, Agent, or Firm—Perman & Green, LLP

[57] ABSTRACT

The invention relates to the transmission of multimedia objects in a digital broadcasting system and particularly to the transmission of a reference system and the start-up procedure of a multimedia presentation according to the MHEG standard via a broadcasting system according to the DAB standard. According to the invention, the DAB ensemble according to the DAB standard and the service channel and fast information channel comprised by the DAB ensemble are handled as virtual, multiplexed MHEG objects, whereby they and the real MHEG objects positioned below them are referred to in a manner specified in the standard ISO/IEC 13522. In addition, information about start-up procedures relating to a multimedia program or a corresponding series of operations is transmitted in a special file, and a parameter in the file descriptor associated with said file indicates that said file contains instructions for said procedures.

12 Claims, 3 Drawing Sheets

TRANSMISSION OF MULTIMEDIA OBJECTS IN A DIGITAL BROADCASTING SYSTEM

BACKGROUND OF THE INVENTION

The invention relates to the transmission of multimedia objects in a digital telecommunication system in general, and to the transmission of a start-up procedure (script) for multimedia software via a digital telecommunication system.

Multimedia means the presentation of synchronized, audiovisual items to the user. A standard has been created for handling multimedia software on an abstract level. The standard is designated as ISO/IEC 13522, it has 5 parts for the present, and in the following it will be referred to as the MHEG standard (Multimedia Hypermedia Information Coding Experts Group). In this standard, the multimedia software is defined as an entity formed by so called objects. These objects belong to object classes, which have been defined according to a certain syntax, and the members of the object classes are objects to which the class-specific definitions apply. Examples of object classes are links, action objects, composition objects, content objects and container objects. Some objects can be temporarily continuous, in which case they are called streams. In addition, objects can be multiplexed, whereby a multiplexed object consists of two or more streams, which are called component streams. These can again be multiplexed, or contain more streams.

The objects according to the MHEG standard are numbered, whereby they can be referred to by the numbers. The components of multiplexed objects are referred to be hierarchical series of numbers, for example, as in the standard MHEFG1, or by unique numbers without a hierarchy, as in the standard MHEG5. Let us assume, for example, that a multiplexed object A of the content class is denoted by number 1, as in FIG. 1, and it comprises a component stream B, the object number of which is 5 and which further comprises component streams, one of which, C, is denoted by 2. Thus the series of numbers, 1.5.2., according to the standard MHEG1, refers to the component stream C on the lowest level of the hierarchy, and at the same time indicates that the hierarchy has three levels. According to the standard MHEG5, each of the objects has a unique number without any hierarchical indications.

In order to produce a multimedia presentation by using objects according to the standard MHEG, a special tool is needed to handle or interpret the objects, organize the relations between them correctly by using the numerical references and control their presentation to the user. This tool is known as the "MHEG engine". It is generally implemented programmably, and its operation is defined in the standard MHEG on a general level.

Digital, broadcast-type telecommunication systems will become an important method for implementing massive data transfer, such as radio and television, in the future. Examples of digital broadcasting systems are the DAB and DVB systems (Digital Audio Broadcasting: Digital Video Broadcasting), but with certain assumptions, the invention can also be generalized to other types of systems. Because the present invention relates to the transmission of a reference system according to the MHEH standard and a start-up procedure for a multimedia presentation via a digital broadcasting system, in order to shed light on the background of the invention, the features of the DAB system that support that implementation of the invention will be described briefly in the following. The essential parts of the DAB system are defined in the standard ETS 300 401.

In according with FIG. 2, one signal stream transmitted by a transmitter according to the standard forms a DAB ensemble, which can contain a number of services E, F, G. In view of the user, each service corresponds to one radio channel of the present systems, and it consists of one or more service components H, I, J, K, L, M. A single service component can contain, for example, the audio part offered by the service, such as music, or a data part related to it, such as the lyrics of the song being played, or other information related to the service. One service component can belong to more than one service, like component J in FIG. 2. The service component which is the most essential in view of the serivce is called the primary service component, and other service components incorporated in the service are called secondary service components. The primary service component is often the audio part offered by the service, but it can also be a data part. The service can also contain many audio parts as service components. The connection between a service and its primary service component is denoted by a thick line in FIG. 2.

The information to be transmitted from the transmitter to the receiver over the radio interface of the DAB system is divided temporally into transmission frames S as shown in FIG. 3, the length of which frames can be 24 or 96 milliseconds, depending on the mode of operation. Each transmission frame S comprises three parts relating to the so called channels, which are: Main Service Channel (MSC), Fast Information Channel (FIC) and Synchronization Channel (Sync). The above mentioned service components E, F, G are contained in the service channel MSC, which is further divided into separate convolution-coded sub-channels O, P, Q, R as shown in FIG. 2. Each sub-channel can contain one or more service components. The mutual order of the service components and sub-channels is called multiplex configuration. The Fast Information Channel FIC contains the Multiplex Configuration Information MCI in particular, but it can also be used for transmitting other information quickly from the transmitter to the receiver. Like the service channel, it is divided into smaller parts as shown in FIG. 3, which are called Fast Information Blocks (FIB). The blocks further contain groups (FIG, Fast Information Group, not shown in FIG. 3). The synchronization channel Sync is used to control the transmission and reception operation of the system, such as the synchronization of the transmission frames.

A prior art solution, which would enable the transmission of a multimedia program consisting of objects organized by means of numerical references via a digital broadcasting system in a manner such that the properties of the broadcasting system itself are utilized by integrating them into the definitions of the multimedia program, is not known to exist.

SUMMARY OF THE INVENTION

It is an object of the present invention to disclose a method for starting a multimedia program of the MHEG type or other series of operations, when the multimedia program or description of the series of operation is transmitted via a digital broadcasting system. A further object of the invention is also to utilize the sign reference system of the multimedia program in data transfer.

The objects of the invention are achieved by applying a file type identification system according to a standard used in a digital broadcasting system for identifying the start-up script of a multimedia program according to the MHEG standard or any other series of operations, which script comprises, for example, the references to other objects required to start the program.

The method according to the invention for transmitting a program consisting of objects organized by means of a sign reference system via a digital broadcasting system is characterized in that the instructions concerning procedures required to start the program form a file, which comprises references to the objects and which is associated with a file descriptor of a predetermined format for identifying the type of the file, and which file and file descriptor are transmitted via the digital broadcasting system.

The invention also relates to transmitter and receiver equipment which participate in the implementation of the data transfer by means of the method according to the invention. Transmitter equipment according to the invention, which is suitable for being used in DAB transmission, is characterized in that it comprises means for creating sign references to the DAB ensemble, to the service channel and to the fast information channel so that the sign references are positioned in the hierarchy above the signs referring to the objects. Receiver equipment according to the invention is characterized in that it comprises means for interpreting the sign references to identify the DAB ensemble, service channel and fast information channel and objects positioned below them in the hierarchy, which objects are part of the program.

The known standard MHEG is based on the idea of presenting a multimedia program to users locally, in principle, whereby it is assumed that when the objects have been defined and identified by certain number or sign references, they have also been stored in the memory of the equipment used for the presentation. In digital broadcasting, the data transfer capacity is generally so limited that all the objects cannot be available simultaneously, but they are sent as a certain sequence in which various objects can be repeated at different frequencies. The invention is based on the idea that digital systems intended for the transfer of multimedia software are prepared for the transfer of data as files, and that in these systems it is possible to attach control data to the transmission, which control data describe the type of each file to be transferred. In the procedure according to the invention, a certain start-up file contains the necessary references and other packed data, on the basis of which the receiving equipment can identify the objects of the multimedia program and start the reception and presentation of the multimedia program.

In another embodiment of the invention, which is based on a hierarchical system of numerical references according to the standard MHEG1, a very abstract concept of the broadcasting system (DAB ensemble, service channel, fast information channel) can be defined as a multiplexed MHEG object with a high level of hierarchy, although it is not an object in the same sense as the known members of the MHEG object classes. In order to clarify the difference, the concept of a virtual object has been created in the invention. It is not a real object in the sense that it cannot, for example, be transferred via the data transfer system in the same way as an audio stream or an image file, but it only exists as a unifying concept positioned above certain real objects in the hierarchy. A virtual object follows the same rules of reference as other multiplexed objects according to the standard MHEG, and with regard to the availability of the objects it is considered to be always available. Of the components positioned below the virtual object, the lowest are always real MHEG objects.

BRIEF DESCRIPTION OF THE DRAWING

In the following, the implementation of an embodiment of the invention will be described in more detail with reference to the accompanying drawings, in which.

DETAILED DESCRIPTION OF THE INVENTION

Figure 1:
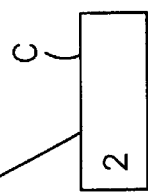
FIG. 1 shows a known hierarchy of MHEG objects.
Figure 2:
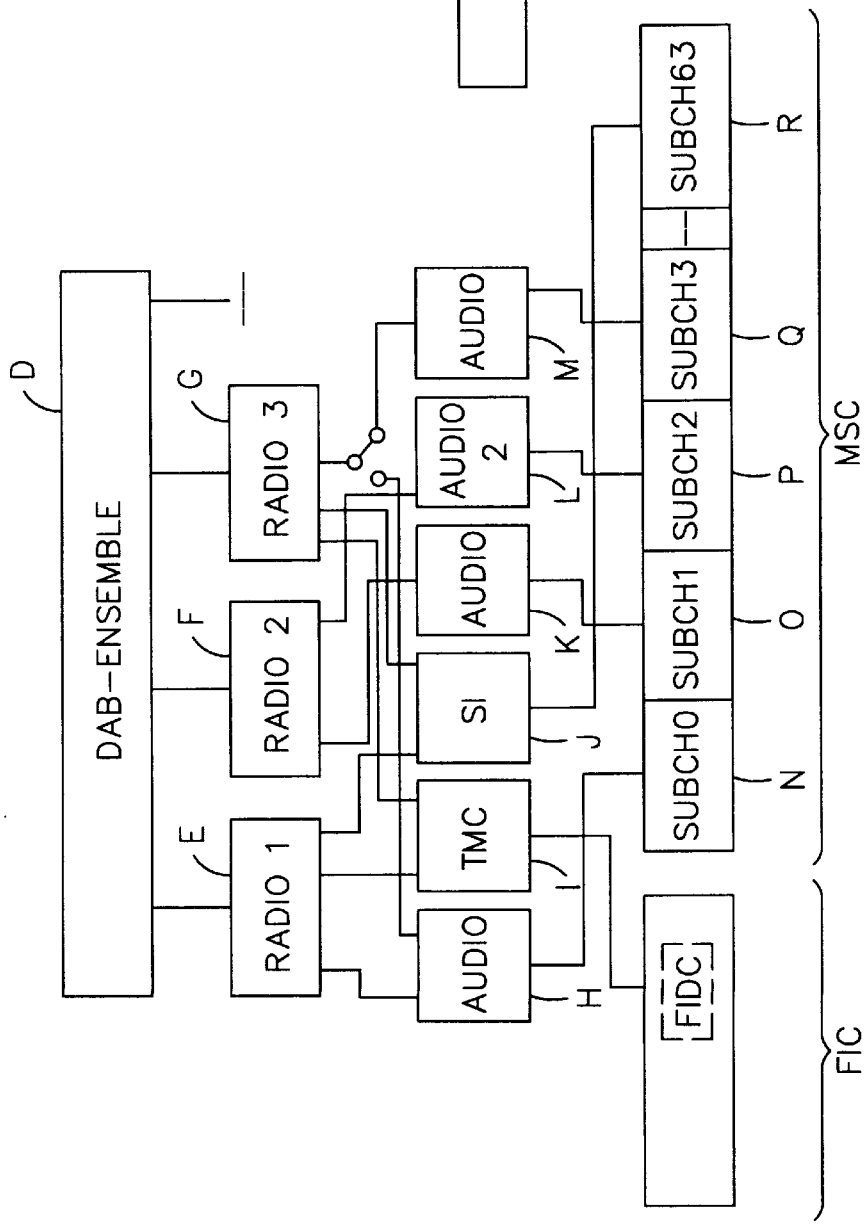
FIG. 2 shows a known structure of a DAB ensemble.
Figure 3:
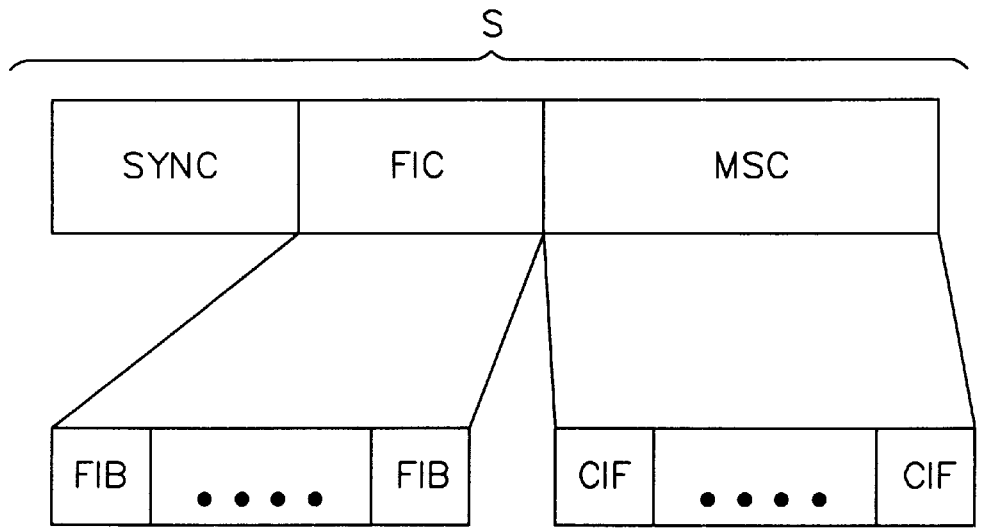
FIG. 3 shows a known structure of a DAB transmission frame.
Figure 4:
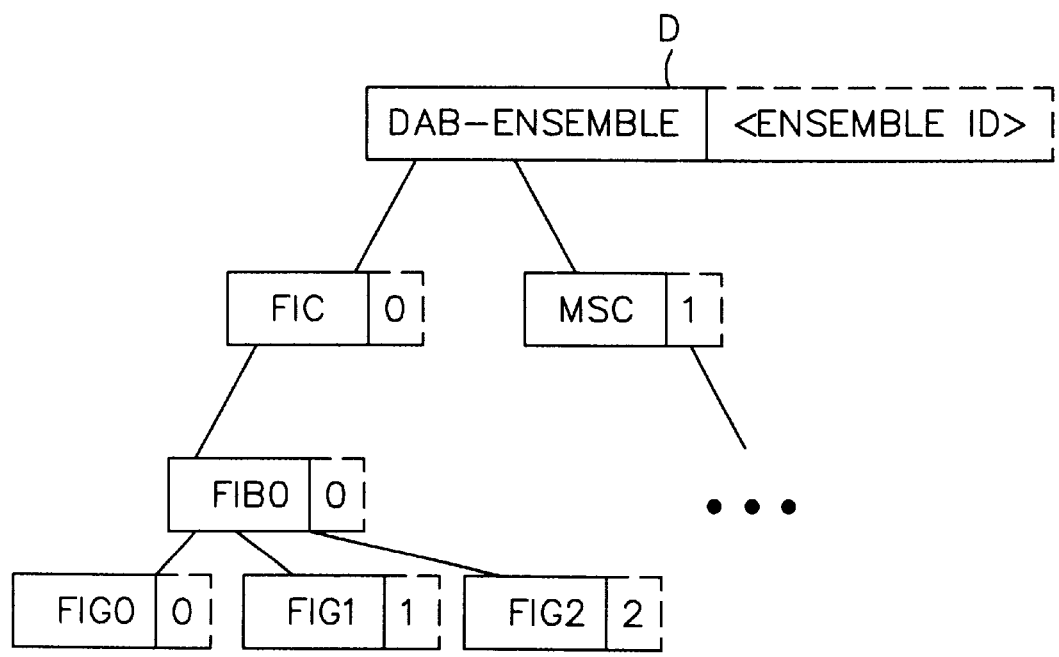
FIG. 4 shows the method according to one embodiment of the invention of referring to concepts of the DAB standard as virtual objects.
Figure 5:
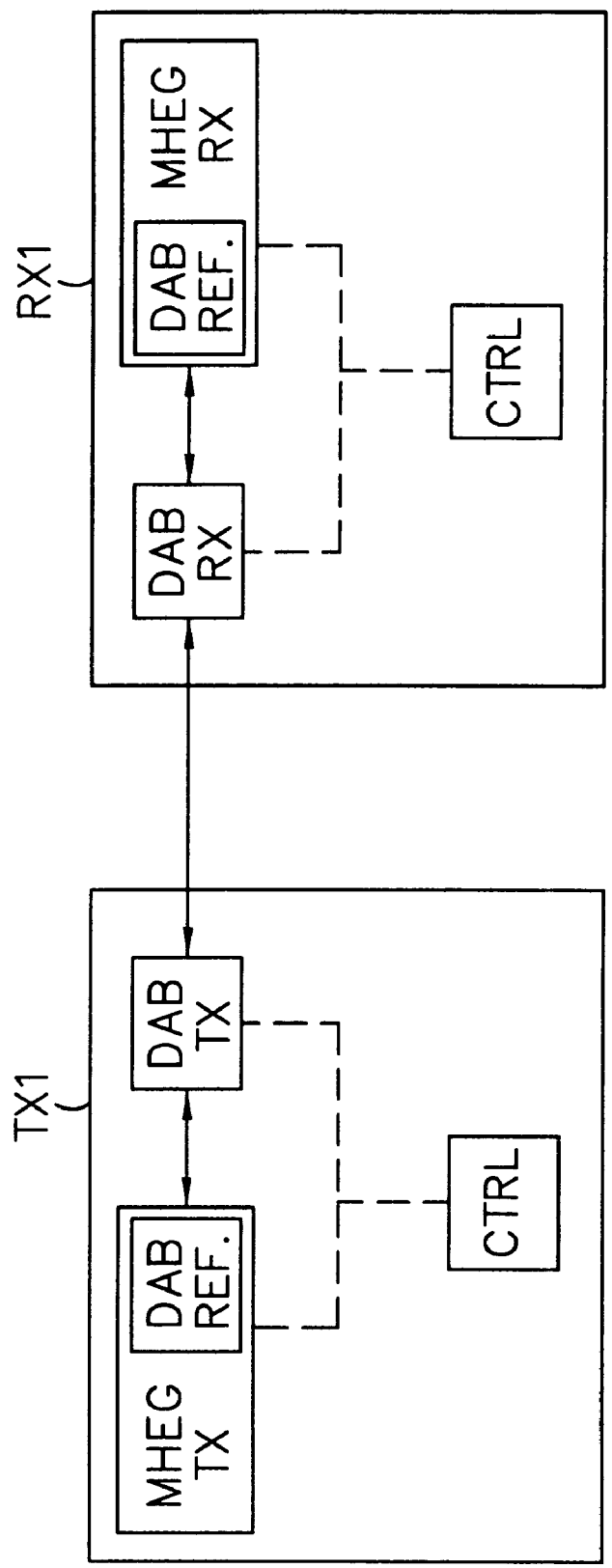
FIG. 5 shows a block diagram of equipment using the method according to the invention.

In the above, reference has been made to FIGS. 1 to 3 in the description of the prior art, and therefore reference will be made primarily to FIGS. 4 and 5 in the following.

The present invention discloses an arrangement in which information indicating which of the parts received contains operating instructions for starting a multimedia program is transmitted to the receiver via a digital broadcasting system.

The operating instructions can be, for example, references to executable, script-type objects, the execution of which actually starts a multimedia program. This arrangement will be described in the following. It is to be noted that the same arrangement can also be used to process other files causing measures to be taken in the receiver, and this part of the invention thus need not be limited to the start-up procedures of multimedia programs.

On a generic level, the standard MHEG suggests that the objects of a multimedia program should be prepared for the presentation by setting them in a so called O3 state, in which they are ready to be immediately presented to the user. The preparation will be carried out by the MHEG engine, but the execution of the procedure is not accurately defined in the standard MHEG. When transmission takes place via a digital broadcasting system, this can be interpreted to mean at least that the objects are transferred from the transmitter to the receiver and loaded to the memory of the receiver. In addition, there may be a script-type object containing operating instructions in the form of program code, which must be compiled and linked to a form in which the instructions contained by it are directly executable by the receiving device. Furthermore, the operation of the MHEG engine can also include an aliasing phase, in which the names of the objects are replaced by references according to the invention. The aliasing takes place by means of an aliasing table maintained by the MHEG engine.

In accordance with the invention, the receiver will first search from the information it has received a container-type object transmitted in the form of a file, hereinafter referred to as a start-up container, which contains other objects needed to start the multimedia program. The receiver identifies the transmitted file easily, if the file descriptor (in the DAB standard, in particular, a 0011-type data group) associated with it includes a parameter indicating the file type, and which shows that the file is of the start-up type.

Loading this container-type object to the memory is a preparatory measure according to the standard MHEG. After the loading, the MHEG engine interprets the instructions contained by the start-up container, which concern the formation of an aliasing table and the reception and loading of other objects related to the program are not received and loaded immediately but they are received and loaded when needed in order to save space in the memory of the receiver.

Correspondingly, a file description can comprise any other code indicating the file type, for example, indicating that the file to be transferred is a script-type file with operating instructions for a data service, or a program file (.exe), which can be directly executed by the receiving device. Then the receiving device can open the file on the basis of the file description and execute the operations contained in it in order to start using a data service, for example.

So that the user might start using a multimedia program or a data service transmitted via a digital broadcasting system as quickly as possible, the file containing the start-up container or other starting instructions should be transmitted frequently. As a consequence, the file should not be very large. By using the method according to the invention, references to other MHEG objects, for example, can be efficiently implemented in the start-up container.

In the following, an embodiment of the invention, which uses the hierarchical numeral reference system of the standard MHEG1 and which is particularly suited for DAB transmission, will be described in more detail. The DAB ensemble and the service channel and fast information channel positioned below it in the hierarchy can be defined as so called virtual objects according to this embodiment of the invention. Because the synchronization channel cannot contain MHEG objects, it is not practical to define it as a virtual object. According to the embodiment of the invention, the DAB ensemble is referred to by its number, which is denoted by the code <ENSEMBLE ID> in the following, and the channels are denoted by numbers, which are preferably number 0 for the fast information channel FIC and number 1 for the service channel MSC. In FIG. 4, the references according to the invention, by means of which the concepts of the DAB standard are handled as virtual objects, are encircled by a broken line and positioned beside the corresponding concepts of the DAB standard. The information groups FIG0, FIG1, FIG2 contained by the fast information channel are handled in the methods according to the invention as real MHEG objects, because groups of a certain type form a stream. For example, a reference to the second group of the 0th block (FIG. 0/2 in the DAB system, that is, group FIG2 positioned below FIB0) is, according to the invention, preferably <ENSEMBLE ID>.0.0.2 in the MHEG form, and it is used to identify the stream formed by the information groups.

According to this embodiment of the invention, the service channel (MSC) and the sub-channels contained by it are virtual objects according to this embodiment of the invention, and the stream contained by the sub-channel is a real MHEG object with the same number as the TMId parameter indicating its type according to the DAB system. The audio stream contained by the sub-channel, for example, is preferably referred to by the reference <ENSEMBLE ID>.1.<SubCh ID>.0 according to the invention, and a service component stream in a packet form by the reference <ENSEMBLE ID>.1.<SubCh ID>.3, wherein <SubCh ID> means the number of the sub-channel, and the stream numbers 0 and 3 are the TMId parameters. If the reference system according to the invention is extended to relate to PAD (Program Associated Data) streams, the references may have more levels in addition to the four levels presented above, because according to the DAB standard, the PAD stream may further comprise component streams.

The service components contained by the service component stream in a packet form can advantageously be identified for the reference system according to the invention by the SCId (Service Component Identification) parameter according to the DAB standard. Another alternative for identification would be to use a packet address, which is common to all the packets of a certain service component. If the service component stream consists of file streams, a single file stream can be identified by a suitable numeric parameter in the file descriptor, which is a data group (of the type 0011) according to the DAB standard and contains file-specific parameters. The file descriptor preferably contains an object number, which is file-specific and which can be used as the reference number of the stream formed by the file in question in the reference system according to the invention.

It can be assumed, for example, that a multimedia program according to the standard MHEG includes as an object a file with a unique reference number 7. Thus the reference 7 indicates one object, but correspondingly the numerical series reference <ENSEMBLE ID>.1.<SubCh ID>.3.<SCId>.7 refers to a certain DAB ensemble (reference number <ENSEMBLE ID>) and below it to a service channel (reference number 1) and below it to a certain sub-channel (reference number <SubCh ID>) and below it to a service component stream in a packet form (reference number 3) and below it to a certain service component (reference number <SCId>) and below it to a certain file (reference number 7).

If the multimedia program in question is transmitted via a broadcasting system according to the DAB standard so that during one presentation only one version of the file is transmitted, the references can be regarded as convergent.

The invention also relates to transmission and reception equipment, which are suitable for transmitting a program consisting of objects ordered by numerical references via a digital telecommunication system. FIG. 5 shows a simple block diagram with a transmitter TX1 and a receiver RX1. A requirement for the transmitter TX1 is that its block MHEG TX handling the MHEG program contains a part DAB ref, which creates a mapping between the DAB standard and the MHEG standard so that items which comply with the DAB standard and are associated with the telecommunication system are described as virtual MHEB objects according to the invention. In an embodiment of the invention, which does not use virtual objects and a hierarchical numerical reference system, this mapping is not needed. It is clear to a person skilled in the art that items referring to the DAB system can be replaced by items associated with other corresponding, digital telecommunication systems.

The actual data transfer takes place between the DAB transmitter DAB TX in the transmitting device TX1 and the DAB receiver DAB RX in the receiving data RX1, the structure and operation of which DAB transmitter and DAB transceiver comply with the standard ETS 300 401. The nature of the telecommunication connection between them is not essential with regard to the invention, but according to the intended use of the DAB system, the connection in the preferred embodiment is a radio connection. A requirement for the receiving equipment RX1 is that its block MHEG RX processing the MHEG program contains a part DAB ref, which can correctly interpret the references to virtual objects formed in the transmitting device and direct the real MHEG objects to be processed by the RX1 MHEG engine (not shown) of the receiving device. The operation of both the transmitting and receiving equipment is preferably controlled by the controller block CTR1. All the operations described above can preferably be implemented programmably, which is as such a technique familiar to a person skilled in the art.

The method according to the invention enables a fast and efficient transmission of references according to the MHEG standard in a broadcasting system according to the DAB standard. The use of a start-up container according to the invention together with the references and the file descriptor associated with the file to be transferred forms an efficient and functional method for starting a multimedia program of the MHEG type or any other series of operations in a receiving device.

What is claimed is:

1. A method for transmitting a program consisting of objects ordered by means of a sign reference system via a digital broadcasting system, wherein the instructions concerning the start-up procedure of the program form a file, which comprises references to the objects and which contains a file descriptor of a predetermined form for identifying the type of the file, and which file and file descriptor are transmitted via the digital broadcasting system.

2. A method according to claim 1, wherein the program is a multimedia program according to the MHEG standard.

3. A method according to claim 2, wherein the file is a container-type object according to the MHEG standard.

4. A method according to claim 1, wherein, when parts of the program are repeatedly transmitted via the digital broadcasting system, said file is repeated more often than other parts of said program.

5. A method according to claim 1, wherein the sign reference system is also a hierarchical sign reference system, and in which the digital broadcasting system comprises a DAB ensemble (D), a service channel (MSC) and a fast information channel (FIC), wherein said DAB ensemble (D), service channel (MSC) and fast information channel (FIC) are handled in said hierarchical sign reference system as parts of said program by positioning them above said objects in the hierarchy, whereby they form virtual objects.

6. Transmitting equipment (TX1) comprising means for transmitting a program consisting of objects ordered by means of a hierarchical sign reference system via a digital broadcasting system, which broadcasting system comprises a DAB ensemble, a service channel and a fast information channel, wherein said transmitting equipment (TX1) comprises means (DAB ref) for creating sign references to said DAB ensemble, service channel and fast information channel so that, in the hierarchy, said sign references are positioned above the signs referring to said objects.

7. Receiving equipment (RX1), which comprise means for receiving a program consisting of objects ordered by means of a hierarchical sign reference system via a digital broadcasting system, which broadcasting system comprises a DAB ensemble, a service channel and a fast information channel, wherein said receiving equipment (RX1) comprise means for interpreting the sign references to identify said DAB ensemble, service channel and fast information channel and objects positioned below them in the hierarchy, which objects belong to said program.

8. A method for transmitting a program consisting of objects ordered by means of a sign reference system via a digital broadcasting system, the method comprising steps of:

forming a file of instructions concerning a start-up procedure of the program, establishing references to objects in the file, providing a file descriptor of a predetermined form for identifying the type of the file, and transmitting said file and said file descriptor via the digital broadcasting system; and wherein, upon transmission of a plurality of files, files containing start-up instructions are transmitted more frequently than files which do not contain start-up instructions.

9. A method according to claim 8, further comprising a step of searching for objects needed to start a multimedia program.

10. A method for transmitting a program consisting of objects ordered by means of a sign reference system via a digital broadcasting system, the method including transmission by a file type identification system wherein the instructions concerning the start-up procedure of the program form a file, the file making references to the objects, the method including a file descriptor of a predetermined form for identifying the type of the file, and which file and file descriptor are transmitted via the digital broadcasting system.

11. Transmitting equipment (TX1) comprising means for transmitting a program consisting of objects ordered by means of a hierarchical sign reference system via a digital broadcasting system, which broadcasting system comprises a DAB ensemble, a service channel and a fast information channel, wherein said transmitting equipment (TX1) comprise means (DAB ref) for creating sign references to said DAB ensemble, service channel and fast information channel so that, in the hierarchy, said sign references are positioned above the signs referring to said objects, and wherein the broadcasting system is operative to transmit a file type identification system wherein the instructions concerning the start-up procedure of the program form a file, the file making references to the objects, a transmission including a file descriptor of a predetermined form for identifying the type of the file.

12. Receiving equipment (RX1), which comprise means for receiving a program consisting of objects ordered by means of a hierarchical sign reference system via a digital broadcasting system, which broadcasting system comprises a DAB ensemble, a service channel and a fast information channel, wherein said receiving equipment (RX1) comprise means for interpreting the sign references to identify said DAB ensemble, service channel and fast information channel and objects positioned below them in the hierarchy, which objects below to said program, and wherein the broadcasting system is operative to transmit a file type identification system wherein the instructions concerning the start-up procedure of the program form a file, the file making references to the objects, a transmission including a file descriptor of a predetermined form for identifying the type of the file.

* * * * *